US012570392B2

(12) United States Patent　　　　(10) Patent No.:　US 12,570,392 B2
　　　Labry　　　　　　　　　　　　　(45) Date of Patent:　　Mar. 10, 2026

(54) AIRCRAFT INCEPTOR TRIM APPARATUS

(71) Applicant: Ratier-Figeac SAS, Figeac Cedex (FR)

(72) Inventor: Pierre-Jacques Labry, Faycelles (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/974,246

(22) Filed: Dec. 9, 2024

(65) Prior Publication Data

US 2025/0256837 A1　　Aug. 14, 2025

(30) Foreign Application Priority Data

Feb. 8, 2024　(EP) ..................................... 24305210

(51) Int. Cl.
　　*B64C 13/28*　　　(2006.01)
　　*B64C 13/04*　　　(2006.01)
　　*B64C 13/08*　　　(2006.01)
　　*B64C 13/14*　　　(2006.01)
(52) U.S. Cl.
　　CPC ............. *B64C 13/28* (2013.01); *B64C 13/04* (2013.01); *B64C 13/08* (2013.01); *B64C 13/14* (2013.01)
(58) Field of Classification Search
　　CPC ......... B64C 13/28; B64C 13/04; B64C 13/08; B64C 13/14
　　See application file for complete search history.

(56) References Cited

U.S. PATENT DOCUMENTS 7,681,842 B2　3/2010　Hors et al.
9,581,226 B2　2/2017　Petrou et al.

9,856,015 B2　1/2018　Saint-Marc et al.
10,377,468 B2　8/2019　Carner et al.
10,926,866 B2　2/2021　Labry et al.
11,396,362 B2　7/2022　Voiles et al.
2009/0189024 A1*　7/2009　Hors ..................... B64C 13/341
　　　　　　　　　　　　　　　　　　　244/221
2012/0097800 A1*　4/2012　Burroughs ............ B64C 13/345
　　　　　　　　　　　　　　　　　　　74/471 XY (Continued)

FOREIGN PATENT DOCUMENTS

CN　　　115027662 A　　9/2022
WO　　2023138227 A1　　7/2023

OTHER PUBLICATIONS

European Search Report for Application No. 24305210.7, mailed Jul. 31, 2024, 35 pages.

*Primary Examiner* — Rodney A Bonnette
(74) *Attorney, Agent, or Firm* — CANTOR COLBURN LLP

(57) ABSTRACT

An apparatus for adjusting aircraft inceptor trim includes an inceptor centring device mechanically coupled to a control shaft that rotates in response to inceptor inputs. The inceptor centring device includes an inceptor centring spring preloaded with a preload force to provide a first biasing force to bias the control shaft to an inceptor neutral position. The apparatus has a trim mechanism, mechanically coupled to the inceptor centring device, and includes a trim locking device having a locked state and an unlocked state. A resistance force of the trim mechanism with the trim locking device in the unlocked state is less than the preload force, such that when the trim mechanism is in the unlocked state, actuation of the inceptor adjusts the position of the inceptor centring device to alter the degree of trim.

14 Claims, 7 Drawing Sheets

(56)             References Cited

U.S. PATENT DOCUMENTS

| 2015/0198209 | A1* | 7/2015 | Lepage | F16D 55/38 |
| | | | | 188/18 R |
| 2017/0106971 | A1 | 4/2017 | Wilkens | |
| 2017/0350491 | A1 | 12/2017 | Wilkens | |
| 2017/0361921 | A1* | 12/2017 | Labry | H01H 50/20 |
| 2020/0258415 | A1 | 8/2020 | Davieau et al. | |
| 2021/0129975 | A1 | 5/2021 | Voiles et al. | |
| 2024/0166337 | A1* | 5/2024 | Picard | B64C 13/28 |

* cited by examiner

AIRCRAFT INCEPTOR TRIM APPARATUS

CROSS-REFERENCE TO RELATED APPLICATIONS

This application claims the benefit of European Patent Application No. 24305210.7 filed Feb. 8, 2024, the disclosure of which is incorporated herein by reference in its entirety.

FIELD

This disclosure relates to an apparatus for adjusting aircraft inceptor trim. This disclosure further relates to a system comprising an apparatus for adjusting aircraft inceptor trim.

BACKGROUND

Inceptor units in aircraft having a trim function, include a Trim Actuator (TA) comprising electrical motors with control electronics driving a non-reversible mechanical chain linked to an inceptor centring spring.

The pilot adjusts the trim using a trim rotary switch, instructing the TA to move the inceptor neutral position to the desired trim position.

Further, when autopilot is in control of the aircraft, the TA can also be used to back-drive the inceptor such that the inceptor position corresponds to the trim orders being sent by the autopilot to the control surface.

In many cases, inceptor back-driving is not required and, in these situations, commonly used inceptor trim systems are overly complex.

SUMMARY

According to this disclosure, there is provided an apparatus for adjusting aircraft inceptor trim. The apparatus includes: an inceptor centring device, configured to be mechanically coupled to a control shaft. The control shaft rotates in response to control inputs provided at the inceptor, the inceptor centring device comprises an inceptor centring spring, and the inceptor centring spring is preloaded with a preload force. The inceptor centring spring is configured to provide a first biasing force to bias the control shaft to an inceptor neutral position. The system also includes a trim mechanism mechanically coupled to the inceptor centring device and comprising a trim locking device having an unlocked state in which the trim locking device is configured to allow adjustment of the position of the inceptor centring device; and a locked state in which the trim locking device is configured to maintain the adjusted position of the inceptor centring device. A resistance force of the trim mechanism with the trim locking device in the unlocked state is less than the preload force, such that when the trim mechanism is in the unlocked state, actuation of the inceptor results in adjustment of the position of the inceptor centring device to alter the inceptor neutral position and hence the degree of aircraft inceptor trim.

It will be understood that the term 'inceptor' includes all aircraft input devices which a pilot may use to instruct control of the aircraft. In particular, where used herein, the term 'inceptor' includes pedals (e.g. rudder pedals) used to control the yaw axis of an aircraft and control columns/yokes used to control the pitch and roll axes of an aircraft.

It will be understood that when the trim locking device is in the locked state, actuation of the inceptor results in the spring being deformed according to the inceptor actuation whilst the trim mechanism is stationary (increasing the force exerted by the spring).

It will be understood that where used herein, the term 'inceptor neutral position' refers to the position which is adopted by the inceptor when there is no input load on the inceptor (i.e. no force exerted on the inceptor by a pilot or autopilot).

It will further be understood that, where used herein, 'trim neutral position' refers to the position in which the degree of trim is substantially equal to 0, i.e. the position in which the inceptor neutral position (i.e. no input load on the inceptor) corresponds to a control surface neutral position.

As such, the trim neutral position is fixed, whereas the inceptor neutral position depends on the current degree of trim.

It will be understood that a spring is an object which can be deformed by a force, and returns to its original shape after the force is removed.

It will be understood that since the spring is preloaded with a preload force (the inceptor centring preload force), the spring has already been deformed to the preload force and so any force that is applied to the spring, which is lower than the preload force, will not act to deform the spring (i.e. the spring will act as a rigid element).

The resistance force of the trim mechanism is a resisting force which resists movement of the inceptor centring device away from the trim neutral position. The resistance force of the trim mechanism may comprise forces resulting from friction present in bearings and/or pivots. The resistance force of the trim mechanism may comprise damping forces resulting from damping devices.

In examples, the inceptor centring device comprises a first part which is configured to be mechanically coupled to the control shaft, a second part which is mechanically coupled to the trim mechanism, wherein the first and second parts are each mechanically coupled to the inceptor centring spring, and wherein the second part is moveable relative to the first part.

In examples, the trim mechanism comprises a trim centring device which is configured to provide a second biasing force to bias the inceptor centring device towards a trim-neutral position, wherein the resistance force includes the second biasing force (i.e. the resistance force comprises the second biasing force, and may further comprise forces resulting from friction present in bearings and/or pivots, and/or damping forces resulting from damping devices.

The second biasing force may increase as the inceptor centring device rotates further away from the trim-neutral position. In examples, the maximum value of the second biasing force (e.g. when the inceptor centring device is at maximum rotation away from the trim-neutral position) is such that the resistance force is less than the preload force of the inceptor centring device spring.

In examples, the trim mechanism comprises a damper configured to damp the second biasing force. The damper may be integrated into the trim locking device. In such examples, the trim locking device may be considered a trim locking and damping device.

In examples, the damper is an electromechanical damper.

In examples, the trim centring device comprises a spring configured to provide the second biasing force.

In examples, the trim centring device comprises a tension spring (e.g. a helical tension spring) configured to provide the second biasing force.

In examples, the trim centring device comprises a compression spring (e.g. a helical compression spring) configured to provide the second biasing force.

In examples, the trim centring device comprises a lever and a cam surface mechanically coupled to the inceptor centring device.

In examples, a first end of the tension spring is coupled to a frame (e.g. a fixed frame of the aircraft), a second end of the tension spring is coupled to a first end of the lever, and wherein the lever is configured to pivot about a pivot point such that a second end of the lever moves along the cam surface such that the tension spring is extended when the inceptor centring device is rotated away from the trim neutral position (i.e. the tension spring is extended regardless of whether the current degree of trim is positive or negative (e.g. yaw right trim or yaw left trim, nose up trim or nose down trim, roll right trim or roll left trim)).

In examples, the second end of the lever comprises a roller configured to roll along the cam surface.

In examples, the cam surface is a V-shaped (e.g. V-shaped or U-shaped) cam surface.

In examples, the trim locking device comprises a power-off brake.

In examples, the inceptor centring device is mechanically coupled to the trim locking device via one or more gears (i.e. the mechanical coupling is realised via the meshing of one or more gears).

In examples, the inceptor centring spring is a torsion spring. In such examples, it will be understood that the preload force is a preload torque. In such examples, the adjustment of the position of the inceptor centring device to alter the degree of trim may be via rotation of the entire inceptor centring device (e.g. about the axis of the control shaft).

In examples, the inceptor centring spring is a helical torsion spring.

In examples, the inceptor centring device is configured such that the torsion spring is wound more tightly both when the control shaft rotates in the clockwise direction and when the control shaft rotates in the anti-clockwise direction.

In examples, the inceptor centring device comprises a driving member (e.g. tooth) which is coupled to the control shaft, and a retaining member (e.g. tooth) which is configured to be stationary when the trim locking device is in the locked state, and moveable when the trim locking device is in the unlocked state, wherein the inceptor centring device is configured such that, when the trim locking device is in the locked state, and the control shaft is rotated, the driving member acts on a first end of the torsion spring and the retaining tooth retaining member retains a second end of the torsion spring such that the torsion spring is wound more tightly. When the trim locking device is in the unlocked state, and the control shaft is rotated, the driving member acts on a first end of the torsion spring and the retaining member is allowed to move when acted upon by a second end of the torsion spring such that the entire inceptor centring device is rotated.

In examples, the inceptor centring device comprises a compression spring (e.g. a helical compression spring). In examples, the inceptor centring device comprises a push-pull rod. In such examples, the adjustment of the position of the inceptor centring device to alter the degree of trim may be via the movement of an anchorage element of the push-pull rod.

In examples, the inceptor centring spring is a tension spring (e.g. a helical tension spring). In examples, the inceptor centring device comprises a lever and a cam surface mechanically coupled to the control shaft. In such examples, the adjustment of the position of the inceptor centring device to alter the degree of trim may be via the movement of an anchorage element of the tension spring.

In examples, the trim mechanism comprises one or more trim sensors mechanically coupled to the trim mechanism and configured to detect the trim position.

According to the present disclosure, there is provided a system comprising an apparatus as disclosed above, a first aircraft inceptor, and one or more inceptor sensors, wherein the first aircraft inceptor, and the one or more inceptor sensors are mechanically coupled to the control shaft.

It will be understood that the inceptor sensors are configured to send instructions to a fly-by-wire aircraft control system which in turn instructs movement of the aircraft control surfaces.

In examples, the system comprises an inceptor damper mechanically coupled to the inceptor centring device and configured to damp the first biasing force provided by the inceptor centring device.

In examples, the system comprises a second aircraft inceptor mechanically coupled to the control shaft. The first inceptor may be a pilot's inceptor while the second inceptor may be a first officer's inceptor.

In each of the examples described above, the inceptor may be a pair of rudder pedals for controlling the yaw axis of an aircraft. In such examples, the inceptor centring device may be considered to be a pedal centring element.

In each of the examples described above, the inceptor may be a control column or yoke for controlling the pitch and roll axes of an aircraft. In such examples, the inceptor centring device may be considered to be a column or yoke centring element.

In each of the examples described above, the inceptor may be a control column or yoke for controlling the roll axis of an aircraft. In such examples, the inceptor centring device may be considered to be a column or yoke centring element.

BRIEF DESCRIPTION OF DRAWINGS

One or more non-limiting examples will now be described, by way of example only, and with reference to the accompanying figures in which.

DETAILED DESCRIPTION

Figure 1:
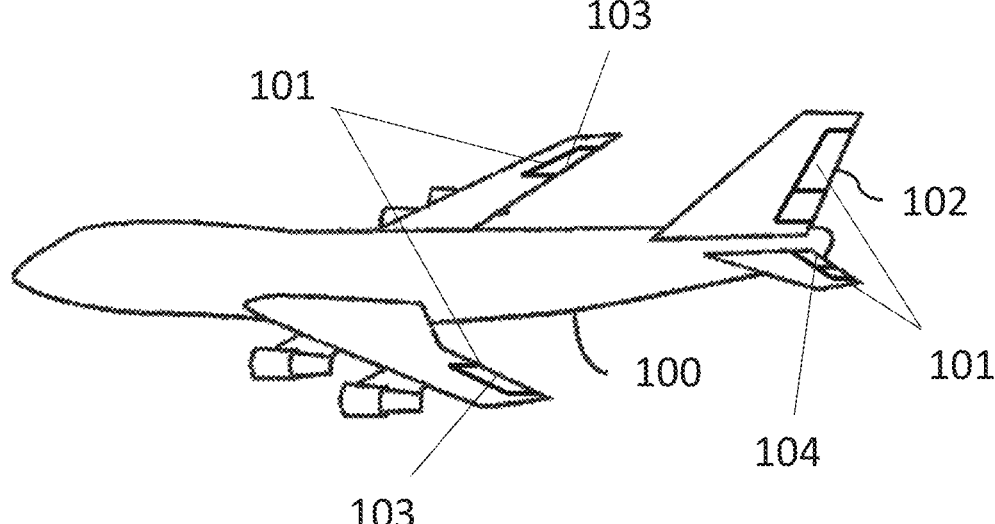
FIG. 1 shows an aircraft having control surfaces.

FIG. 1 shows an aircraft 100 comprising a plurality of control surfaces 101. The control surfaces include a rudder 102, ailerons 103, and elevators 104.

Figure 2:
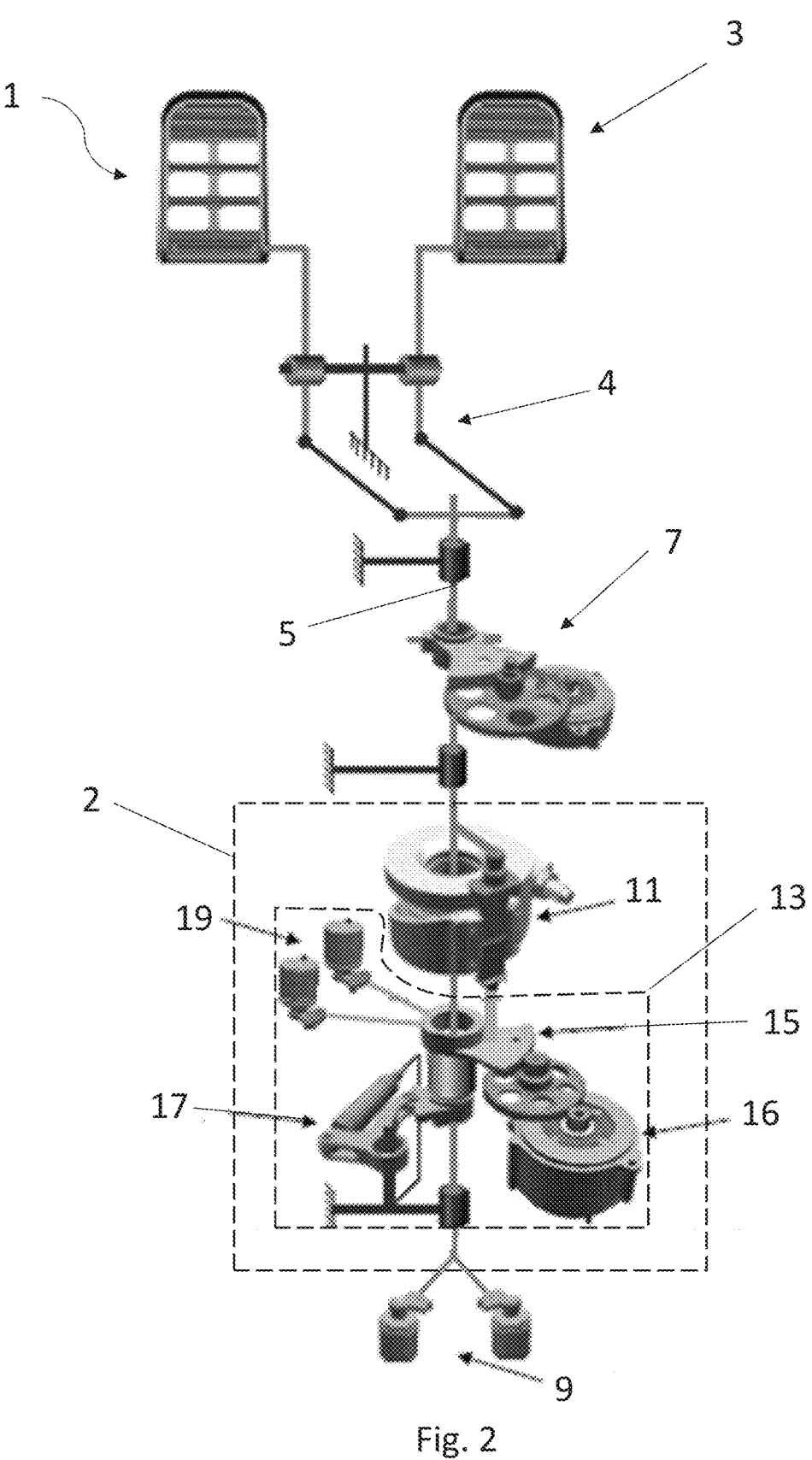
FIG. 2 shows an exploded view of a system including an apparatus for trimming an aircraft rudder operated by rudder pedals.

FIG. 2 shows an exploded view of a system 1 which includes an apparatus 2 for trimming an aircraft inceptor. In the illustrated example, the inceptor is a pair of rudder pedals for controlling the yaw axis of an aircraft. The system 1 includes a pair of rudder pedals 3, a control shaft 5, an inceptor damper and friction mechanism 7, and a pair of inceptor sensors 9.

It will be understood that whilst the apparatus 2 has been illustrated in relation to rudder pedal trim of a fixed wing aircraft, the novel features disclosed herein are applicable to trim adjustment of any aircraft inceptors, including inceptors of rotary wing aircraft (i.e. helicopters). When applied to rotary aircraft inceptors, the apparatus 2 may be used in the trim of cyclic pitch, collective pitch, and tail rotor pitch.

The control shaft 5 is mechanically coupled to the rudder pedals 3 by linkages 4 that are configured such that actuation of the rudder pedals 3 results in rotation of the control shaft 5 about its longitudinal axis. Depression of the left pedal results in an anti-clockwise rotation of the control shaft 5, while depression of the right pedal results in a clockwise rotation of the control shaft 5.

An inceptor damper and friction mechanism 7 is mechanically coupled to the control shaft 5 and is configured to resist rotation of the control shaft 5 such that rapid and/or jerky control shaft movements are prevented. The inceptor damper and friction mechanism 7 also damps any oscillations in the rotation of the control shaft 5. This damper may be an electromagnetic damper, a hydraulic damper, or a friction damper.

The degree of rotation of the control shaft 5 is detected by inceptor sensors 9. The inceptor sensors 9 are configured to send instructions to a fly-by-wire aircraft control system (not shown) which in turn instructs movement of the aircraft rudder 102. It will be understood that in examples, only one inceptor sensor 9 may be provided, but in the illustrated example, two are provided for redundancy. It will be understood that, in examples, the control shaft 5 may be mechanically coupled (e.g. by cable linkages) to the aircraft control surfaces (e.g. the aircraft rudder) such that the control shaft 5 acts directly on the control surface.

It will be understood that where used herein, the term 'pedal neutral position' corresponds to the term 'inceptor neutral position' and refers to the position which is adopted by the rudder pedals 3 (inceptor) when there is no input load on the pedals (i.e. no force exerted on the pedals by a pilot or autopilot).

It will further be understood that, where used herein, 'trim neutral position' refers to the position in which the degree of rudder trim=0. i.e. when the pedal neutral position corresponds to no left or right rudder.

As such, the trim neutral position is fixed, whereas the pedal neutral position depends on the current degree of rudder trim.

It will be understood that the apparatus 2 may be compatible with a plurality of different systems, and so features of the apparatus 2 discussed below should not be construed as being limited to the specific system 1 shown in FIG. 1.

The apparatus 2 comprises an inceptor centring device 11, and a trim mechanism 13 which includes a trim gear sector 15, a trim locking and damping device 16, and a trim centring device 17. The trim mechanism may also comprise one or more trim sensors 19. Operation of the individual elements of the apparatus 2 will be discussed below in relation to FIGS. 3-5.

Figure 3:
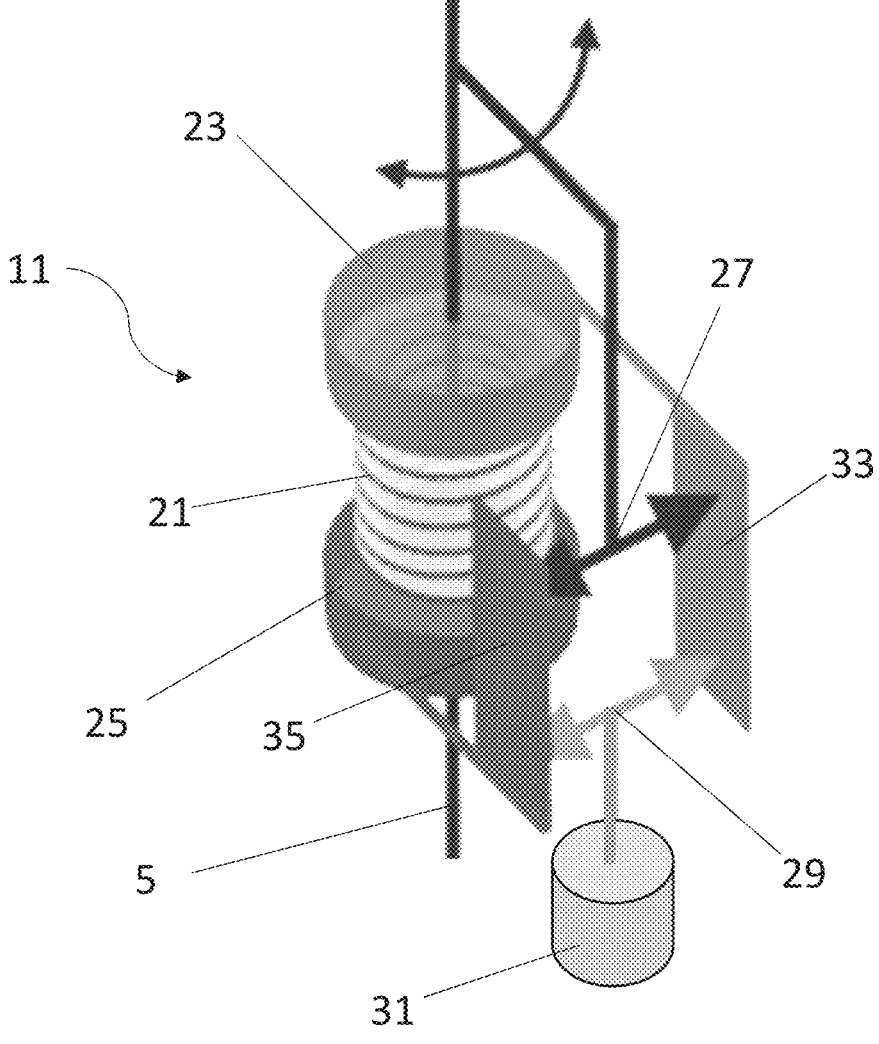
FIG. 3 shows a schematic illustration of an inceptor centring device.

FIG. 3 shows a schematic illustration of the inceptor centring device 11. The inceptor centring device 11 comprises a helical torsion spring 21, an upper cup 23, a lower cup 25, a driving tooth 27, a retaining tooth 29, and an anchorage element 31. The upper and lower cups 23, 25 each at least partially surround the torsion spring 21 and are free to rotate around the control shaft 5.

A first end of the torsion spring 21 is coupled to the upper cup 23 at a first connection point. A second end of the torsion spring 21 is coupled to the lower cup 25 at a second connection point. Each of the upper and lower cups 23, 25 comprise respective driving surfaces 33, 35.

Both the driving tooth 27 and the retaining tooth 29 are sandwiched between the driving surfaces 33, 35. Further, each of the driving surfaces 33, 35 overlap with both of the driving tooth 27 and the retaining tooth 29 such that both driving surfaces 33, 35 can be acted upon by the driving tooth 27 and the retaining tooth 29.

The driving tooth 27 is rigidly coupled to the control shaft 5. The retaining tooth 29 is rigidly coupled to the anchorage element 31 which is rigidly coupled to the trim gear sector 15. As such, the retaining tooth 29 is only allowed to move when the trim locking and damping device 16 is in an unlocked state. When the trim locking and damping device 16 is in a locked state, the anchorage element 31, and thus the retaining tooth 29 are fixed in position.

When a left-hand rudder input is received, the control shaft 5 rotates anti-clockwise. This rotation also moves the rigidly connected driving tooth 27 in an anti-clockwise direction (to the right in the reference frame of FIG. 3). As a result, the driving tooth 27 acts on the driving surface 33 of the upper cup 23, and hence pulls on the first end of the torsion spring 21 via the first connection point.

The second end of the torsion spring 21 acts on the lower cup 25 via second connection point, and so the driving surface 35 of the lower cup 25 acts on the retaining tooth 29. Since the retaining tooth 29 is fixed in position, the rotation of the control shaft 5 acts to wind the torsion spring 21 more tightly, winding the spring up on itself. When pressure on the left-hand rudder pedal is released, the torsion spring 21 unwinds, acting to move the driving tooth 27 back in line with the retaining tooth 29, moving the control shaft 5 and the rudder pedals 3 back to the pedal neutral position.

When a right-hand rudder input is received, the control shaft 5 rotates clockwise. This rotation also moves the rigidly connected driving tooth 27 in a clockwise direction (to the left in the reference frame of FIG. 3). As a result, the driving tooth 27 acts on the driving surface 35 of the lower cup 25, and hence pulls on the second end of the torsion spring 21 via the second connection point.

The first end of the torsion spring 21 acts on the upper cup 23 via the first connection point, and so the driving surface 33 of the upper cup 23 acts on the retaining tooth 29. Since the retaining tooth 29 is fixed in position, the rotation of the control shaft 5 acts to wind the torsion spring 21 more tightly, winding the torsion spring 21 up on itself. When pressure on the right-hand rudder pedal is released, the torsion spring 21 unwinds, acting to move the driving tooth 27 back in line with the retaining tooth 29, moving the control shaft 5 and the rudder pedals 3 back to a pedal neutral position.

Using the above described arrangement, the torsion spring 21 is wound more tightly both when the control shaft 5 rotates in the clockwise and anti-clockwise directions.

Since both the driving surface 33 of the upper cup 23, and the driving surface 35 of the lower cup 25 each overlap with the driving tooth 27 and the retaining tooth 29, the torsion spring 21 cannot unwind any further than the point at which both driving surfaces 33, 35 are in contact with both driving tooth 27 and retaining tooth 29. As such, the torsion spring 21 can be preloaded with a preload torque, and the preload torque can be set by setting the thickness of the driving tooth 27 and retaining tooth 29. In examples, the inceptor centring device may include a mechanism for adjusting the preload torque.

By preloading (pre-torquing) the torsion spring 21, the inceptor centring device 11 is arranged such that any torque which is applied to the torsion spring 21 via the driving tooth 27 or retaining tooth 29 which is less than the preload torque will not wind the spring 21. As such, when the trim locking device 16 is unlocked, an applied torque which is lower than the pre-load torque will rotate the entire inceptor centring device 11 without winding the torsion spring 21, since the torsion spring 21 will act as a rigid element.

Figure 4:
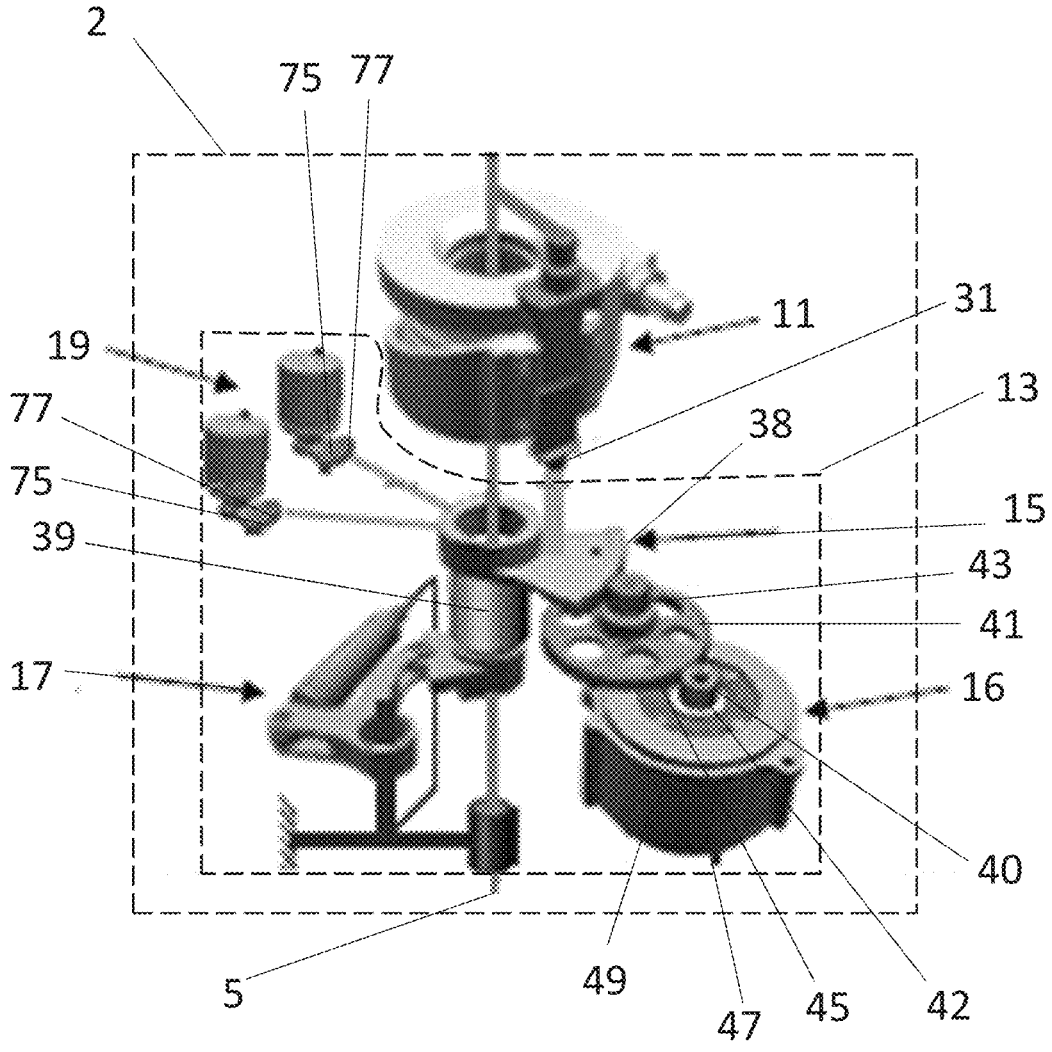
FIG. 4 shows the inceptor centring device of FIG. 3, and the trim mechanism of the apparatus.

FIG. 4 shows an exploded perspective view of the apparatus 2 for trimming an aircraft inceptor. As explained above, the apparatus 2 comprises an inceptor centring device 11, and a trim mechanism 13 which includes a trim gear sector 15, a trim locking and damping device 16, and a trim centring device 17. The trim mechanism 13 shown in FIG. 4 also comprises trim sensors 19. The inceptor centring device 11 shown in FIG. 4 is the inceptor centring device 11 illustrated in FIG. 3.

The anchorage element 31 is rigidly coupled to the trim gear sector 15. The trim gear sector 15 comprises teeth 38, and a body 39 which surrounds the control shaft 5. The body 39, and hence the trim gear sector 15 is free to rotate around the control shaft. The trim gear sector is mechanically coupled to the trim locking and damping device 16. The trim locking and damping device 16 comprises a drive shaft 40 having teeth 42.

In the example illustrated in FIG. 4 the trim gear sector 15 and the trim locking and damping device 16 are coupled via an intermediate gear 41. In the illustrated example, the intermediate gear 41 is a compound spur gear comprising first teeth 43 and second teeth 45. The teeth 38 of the trim gear sector 15 engage with the first teeth 43, and the second teeth 45 engage with the teeth 42 on the drive shaft 40 of the trim locking and damping device 16. It will be understood that in different configurations, the teeth 38 on the trim gear sector 15 could engage directly with the teeth 42 on the drive shaft 40, or the body 39 could engage with the drive shaft 40, or the body 39 and the drive shaft 40 could be integrally formed.

The trim locking and damping device 16 comprises a power off brake (POB) 47 and a damper 49. In the illustrated example, the damper is an electromagnetic damper 49 but in other examples the damper 49 may be any suitable damper, such as a hydraulic damper, or a friction damper.

When no power is being provided to the POB 47, the drive shaft 40 is locked in place, as such, the trim gear sector 15, and anchorage element 31 of the inceptor centring device 11 are locked in place. When power is provided to the POB 47, it is unlocked, and so the drive shaft 40, trim gear sector 15, and anchorage element 31 of the inceptor centring device 11 are free to move, but this movement is damped (via the drive shaft 40) by the electromagnetic damper 49.

The trim centring device 17 is coupled to the body 39 of the trim gear sector 15 and is configured to bias the trim mechanism 13 towards a trim-neutral position. The trim centring device 17 is described in detail in relation to FIG. 7.

Figure 5:
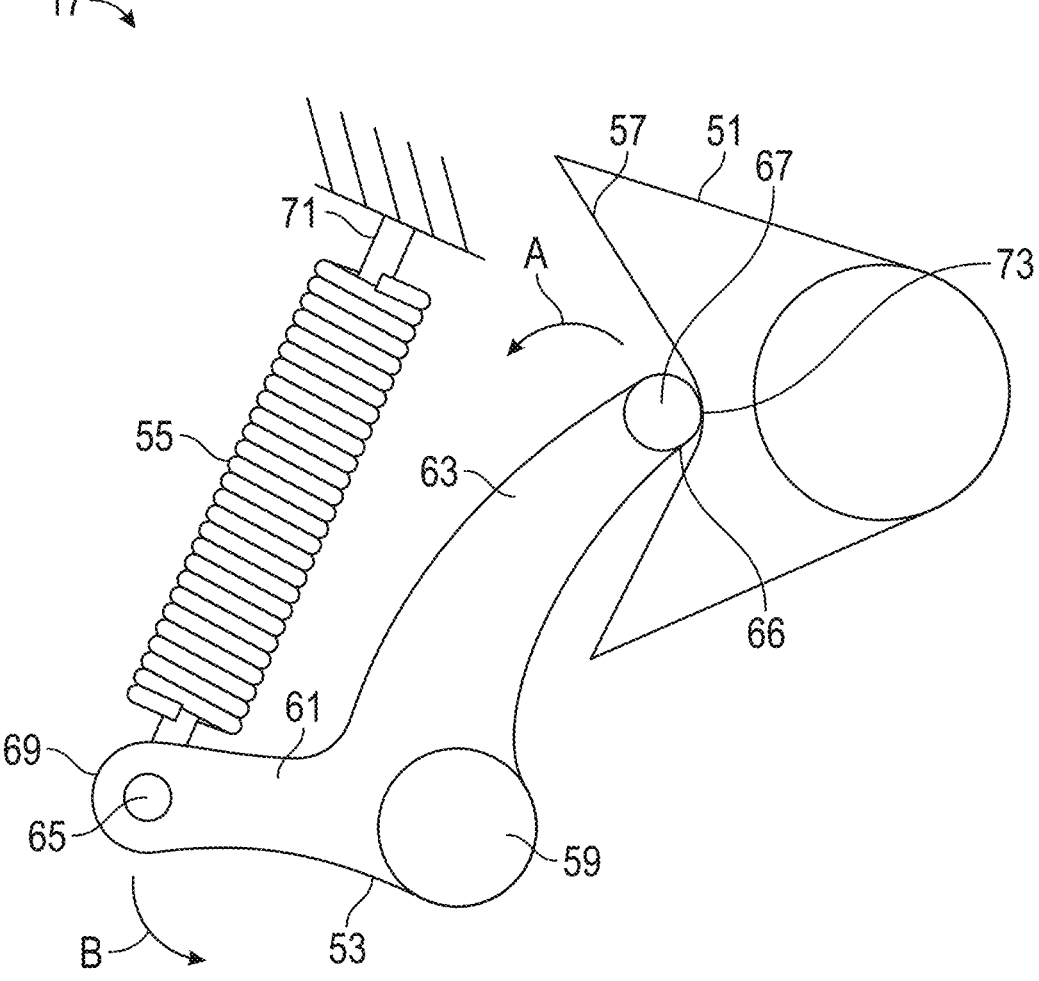
FIG. 5 shows a plan view, schematic illustration of the trim centring apparatus.

FIG. 5 shows a plan view of the trim centring device 17. The trim centring device 17 comprises a cam element 51, a lever 53, and a coil spring 55. The cam element 51 is rigidly coupled to the body 39 of the trim gear sector 15 such that the trim gear sector 15 and the cam element 51 both rotate about the control shaft 5 together. In some examples, the cam element 51 may be unitarily formed with the body 39 of the trim gear sector 15. The cam element 51 comprises a V shaped cam surface 57. The lever 53 comprises a pivot point 59 at which the lever 53 is pivotally mounted to a fixed frame, and a first arm 61, and a second arm 63 which each extend away from the pivot point 59 and each have respective distal ends 65, 66. The distal end 65 of the first arm is pivotally connected to a first end 69 of the coil spring 55. A second end 71 of the coil spring 55 is fixedly mounted to a fixed frame. At the distal end 66 of the second arm 63, a roller 67 is provided which is in contact with the cam surface 57. In the illustrated example, the first arm 61 and the second arm 63 are curved. In examples, the coil spring 55 could be replaced with a torsion spring disposed around pivot point 59. In examples, the trim centring device may not comprise a lever and cam surface, and may be implemented as a torsion spring connected between body 39 and a fixed frame of the aircraft. The illustrated cam surface arrangement is preferable to such alternatives since the gradient of the cam surface can be tuned within a compact design.

The V-shaped cam surface 57 is configured such that when the cam element 51 rotates in either a clockwise, or anti-clockwise direction, the roller 67 rolls along the cam surface 57, away from the pit 73 of the V, and the distal end 66 of the second arm 63 is urged in the direction of arrow A shown in FIG. 5. The lever 53 therefore pivots around pivot point 59, and so the distal end 65 of the first arm 61 moves in the direction of arrow B, extending the coil spring 55. As such, the coil spring 55 acts to bias the trim centring device 17 to the position in which the roller 67 is seated in the pit 73 of the V-shaped cam surface 57. The trim centring device 17 is configured such that this position corresponds to the trim neutral position.

The overall operation of the system 1 will now be explained.

When the pilot desires to trim the inceptor (in the illustrated example, the rudder pedals) they will unlock the trim mechanism 13. This can be done via, for example, a trim unlock button in the cockpit. Upon receipt of a trim unlock instruction, power is provided to the POB 47 unlocking the drive shaft 40, and hence allowing the trim gear sector 15, and anchorage element 31 of the inceptor centring device 11 to move. In this unlocked state, the inceptor centring device 11 is biased towards the trim neutral position by the trim centring device 17, as explained above.

To trim the aircraft rudder 102 (control surface 101), the pilot moves the rudder pedals 3 (inceptor) to the desired position. The apparatus 2 is configured such that the pre-load of the inceptor centring spring 21 is greater than the total maximum force which is resisting rotation of the inceptor centring device 11 across the full range of pedal (inceptor) movement. This force is made up of the damping force from the damper 49, the biasing force generated by the trim centring device 17, as well as general frictional forces (from bearings and linkages).

As a result of the pre-load of the torsion spring 21, the pre-load force must be exceeded before the torsion spring 21 of the inceptor centring device 11 is wound more tightly. As such, when the trim mechanism 13 is unlocked, movement of the rudder pedals 3 (inceptor) acts to rotate the entire inceptor centring device 11, rather than winding the torsion spring 21. When the pilot is happy with the level of trim, they will re-lock the trim mechanism 13, for example, using a trim lock button in the cockpit. Upon receipt of a trim lock instruction, power is cut to the POB 47, locking the drive shaft 40, and hence preventing the trim gear sector 15, and anchorage element 31 of the inceptor centring device 11 from moving. The system is now locked in trim. In the trim-locked state, movement of the rudder pedals 3 will rotate the control shaft 5 and wind up the torsion spring 21 as explained in relation to FIG. 3.

An advantage of this configuration is that, since the inceptor centring device 11 is rotated without winding the torsion spring 21, the inceptor (e.g. rudder pedal) feel (i.e. the force required to depress either the left or right rudder pedal, force required to tilt the control column etc) around the inceptor neutral position is transferred to the trimmed position since, regardless of the trim position, the torsion spring is unwound (other than the pre-load) in the inceptor neutral position.

When the pilot wants to return to the trim-neutral position, they will unlock the trim mechanism 13 in the same way as described above. If the pilot does not exert any pressure on either of the rudder pedals 3 (the inceptor), the inceptor centring device 11, and hence the pedals 3, will return to the trim neutral position as a result of the biasing force provided by the trim centring device 17. The electromagnetic damper 49 ensures that the trim mechanism 13 does not return to the trim neutral position too quickly. This to ensure that the rudder 102 (control surface 101) does not move too quickly, which could unsettle the stability of the aircraft 100.

In the illustrated example, the trim mechanism 13 comprises a pair of trim sensors 19. These trim sensors 19 can be seen in FIGS. 2 and 4. As shown in FIG. 4, the sensors comprise engaging elements 75 having teeth 77. These teeth 77 engage with corresponding teeth 79 on the trim gear sector bearing 39 such that the rotational position of the trim gear sector 15 can be detected by the sensors 19 and hence the trim position can be determined. The trim sensors 19 are configured to send a signal to a display unit in the cockpit (not shown) in order to inform the pilot of the current trim position. It will be understood that in examples, only one trim sensor 19 may be provided, but in the illustrated example, two are provided for redundancy. It will be understood that the trim sensors may be implemented n different ways. For example, one or more trim sensors may be directly embedded in body 39.

Figure 6:
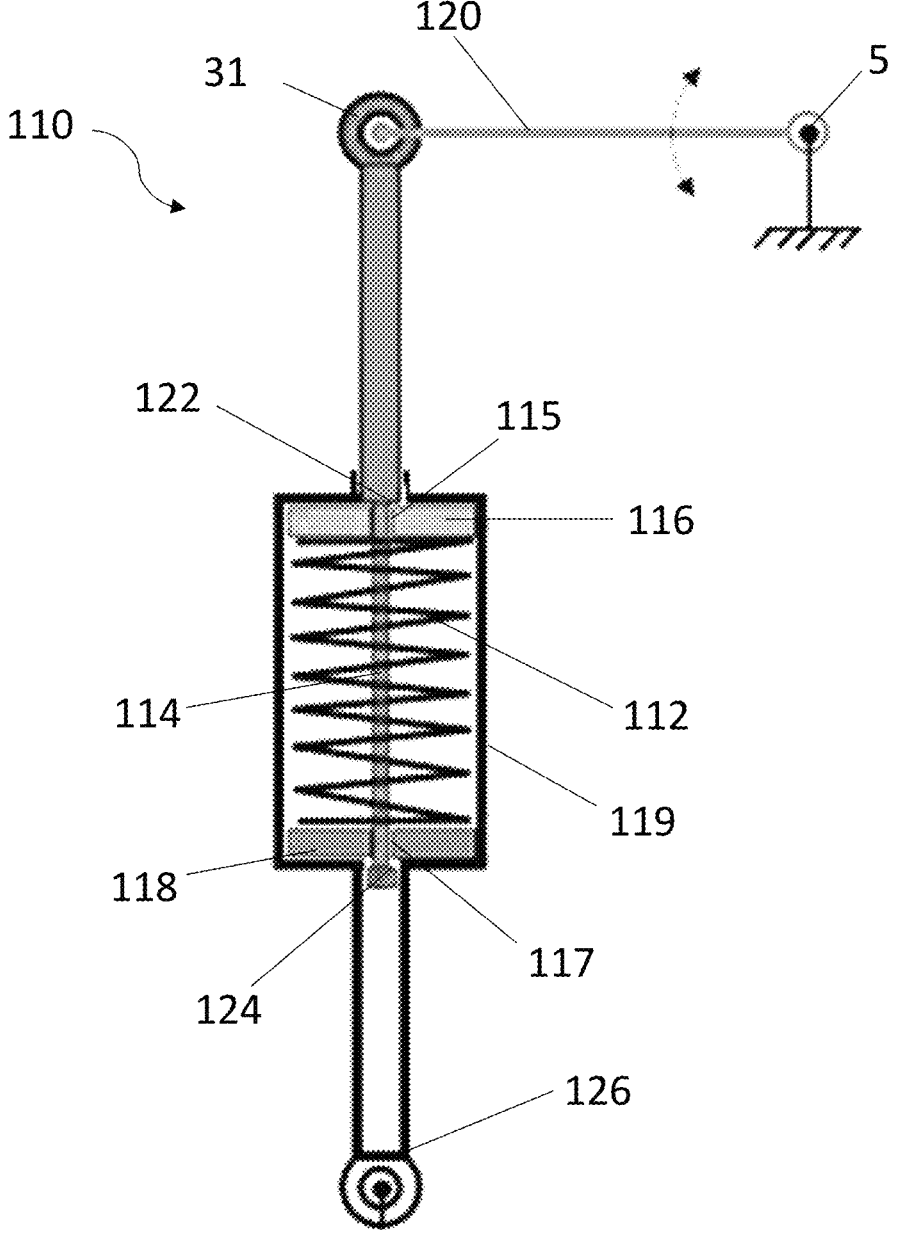
FIG. 6 shows a schematic illustration of an alternative inceptor centring device.

Although the inceptor centring device 11 described above comprises a torsion spring 21, it will be understood that alternative inceptor centring devices may also be suitable for use in the trim mechanism 13. FIG. 6 shows a schematic illustration of another inceptor centring device 110. The inceptor centring device 110 comprises a helical compression spring 112, and a rod 114 which extends coaxially through the compression spring 112. The inceptor centring device 110 further comprises a first driving element 116 which is adjacent to a first end of the spring 112, and a second driving element 118 which is adjacent to a second end of the spring 112. The rod 114 extends through holes 115 and 117 in both the first driving element 116, and the second driving element 118 respectively, and comprises a first shoulder 122 which is adjacent to the first driving element 116, and a second shoulder 124 which is adjacent to the second driving element 118.

The first and second shoulders 122 and 124 are arranged such that when the rod 114 moves in a first direction, the first shoulder 122 abuts the first driving element 116 which acts to compress the spring 112 against the second driving element 118, and such that when the rod 114 moves in a second direction, the second shoulder 124 abuts the second driving element 118 which acts to compress the spring 112 against the first driving element 116.

The inceptor centring device 110 further comprises a spring housing 119, and a bellcrank 120.

The bellcrank 120 is fixedly coupled to the control shaft 5, and pivotally coupled to a first end 126 of the rod 114 such that the bellcrank 120 translates rotation of the control shaft 5 into linear movement of the rod 114.

When the control shaft 5 rotates in an anti-clockwise direction (moving the bellcrank 120 downwards in the reference frame of FIG. 6) the rod 114 is pushed downwards. As a result, the first shoulder 122 acts on the first driving element 116. The second driving element 118 is held in place by the spring housing 119, and the rod 114 is allowed to move through the hole 117 in the second driving element 118 such that the spring 112 is compressed between the first and second driving elements 116, 118.

When the control shaft 5 rotates in a clockwise direction (moving the bellcrank 120 upwards in the reference frame of FIG. 6) the rod 114 is pulled upwards. As a result, the second shoulder 124 acts on the second driving element 116. The first driving element 116 is held in place by the spring housing 119, and the rod 114 is allowed to move through the hole 115 in the first driving element 116 such that the spring 112 is compressed between the first and second driving elements 116, 118.

The spring housing 119 comprises an anchorage element 126 which, when installed in a trim mechanism 13 would be coupled to a trim locking device (not shown). In a similar manner to that explained above with relation to the inceptor centring device 11 of FIG. 3, the compression spring 112 has a pre-load compression force applied to it such that, when the trim locking device is unlocked, and a force lower than the preload force is applied to the rod 114 (and hence the spring 112), the spring 112 acts as a rigid element and so the position of the entire inceptor centring device 111 will be adjusted, altering the trim.

Figure 7:
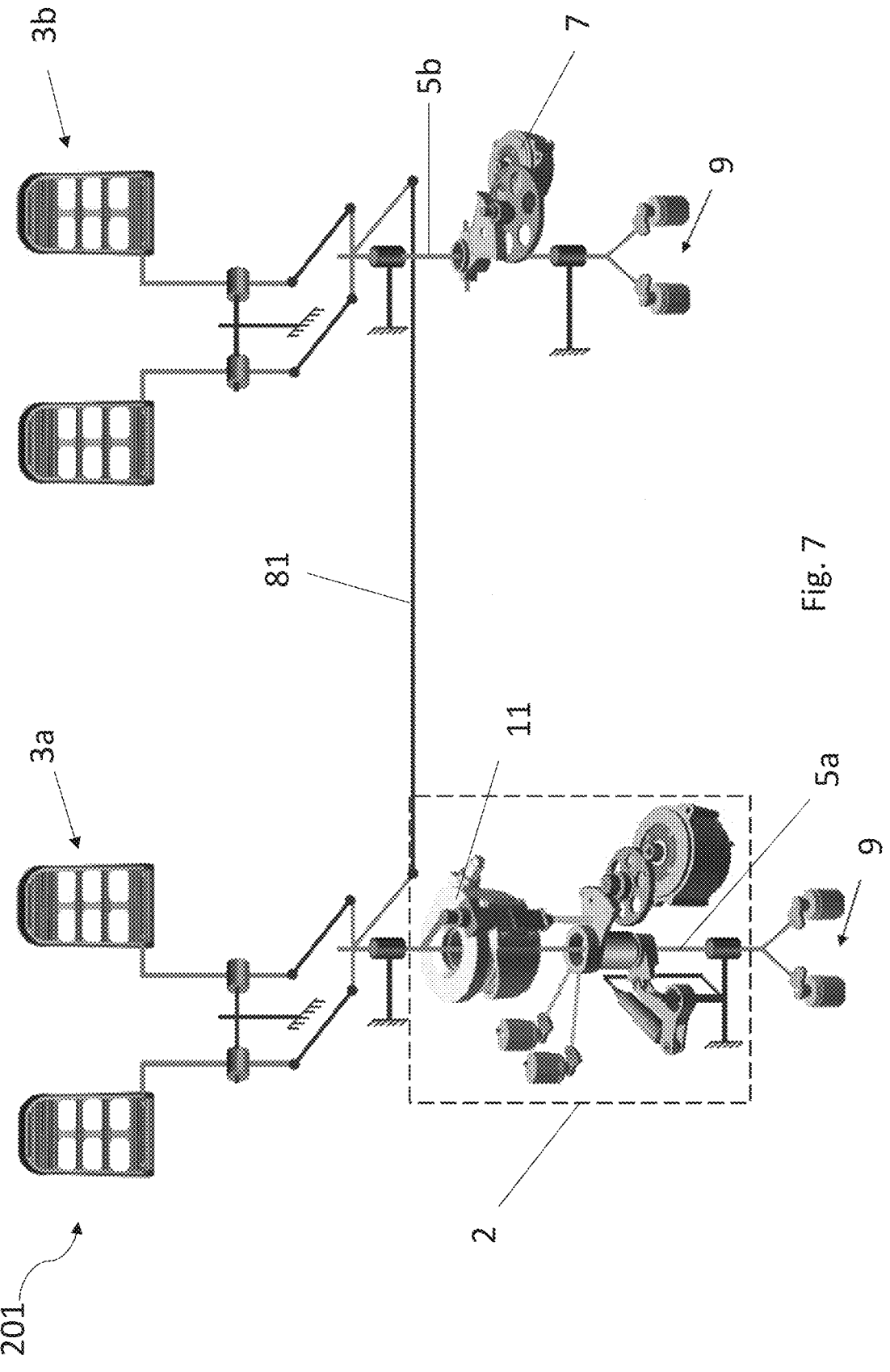
FIG. 7 shows an exploded view of a variant of the system of FIG. 2.

FIG. 7 shows an exploded view of a system 201 which is a variant of the system 1. System 201 may be used in an aircraft having dual controls and includes two inceptors, such as two pairs of rudder pedals, a pilot's pedals 3a and a first officer's pedals 3b. The system 201 comprises the same components as the system 1, but two control shafts, a pilot's control shaft 5a and a first officer's control shaft 5b, are provided, one for each pair of rudder pedals 3a, 3b. The control shafts 5a, 5b are mechanically coupled by linkage 81 such that both control shafts 5a, 5b and both pairs of rudder pedals 3a, 3b move together and rudder trim adjustment can be performed by either a pilot or a first officer.

Since the control shafts 5a, 5b are mechanically coupled, components are shared between the control shafts. In the illustrated example, the inceptor damper and friction mechanism 7 is provided on the first officer's control shaft 5b, and the apparatus 2 (including the inceptor centring device 11 and the trim mechanism 13) is provided on the pilot's control shaft 5a. A pair of inceptor sensors 9 are provided on each of the control shafts 5a, 5b for redundancy.

It will therefore be seen that the apparatus and system of the present disclosure has been designed to work according to the way in which pilot's typically carry out manual inceptor trim adjustment. As such, in certain applications, such as those where no inceptor back driving is required, the apparatus and system of the present disclosure represents a more simple, mechanical system, due to the absence of motors which has the potential to be both lighter, and more reliable than conventional inceptor trim actuator-based systems. The absence of electronics in the apparatus may also lead to a reduced component cost.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An apparatus for adjusting aircraft inceptor trim, the apparatus comprising:
an inceptor centring device configured to be mechanically coupled to a control shaft;
wherein the control shaft rotates in response to control inputs provided at the inceptor;
wherein the inceptor centring device comprises an inceptor centring spring;
wherein the inceptor centring spring is preloaded with a preload force; and
wherein the inceptor centring spring is configured to provide a first biasing force to bias the control shaft to an inceptor neutral position; and
a trim mechanism mechanically coupled to the inceptor centring device;
wherein the trim mechanism comprises a trim locking device having:
an unlocked state in which the trim locking device is configured to allow adjustment of the position of the inceptor centring device; and
a locked state in which the trim locking device is configured to maintain the adjusted position of the inceptor centring device;
wherein a resistance force of the trim mechanism with the trim locking device in the unlocked state is less than the preload force, such that when the trim mechanism is in the unlocked state, actuation of the inceptor results in adjustment of the position of the inceptor centring device to alter the inceptor neutral position and hence the degree of aircraft inceptor trim;
wherein the trim mechanism comprises a trim centring device configured to provide a second biasing force to bias the inceptor centring device towards a trim-neutral position;
wherein the resistance force includes the second biasing force.

2. The apparatus as claimed in claim 1, wherein the trim mechanism comprises a damper configured to damp the second biasing force.

3. The apparatus as claimed in claim 1, wherein the trim centring device comprises a tension spring configured to provide the second biasing force.

4. The apparatus as claimed in claim 1, wherein the trim centring device comprises a lever and a cam surface mechanically coupled to the inceptor centring device.

5. The apparatus as claimed in claim 4, wherein the trim centring device comprises a tension spring configured to provide the second biasing force;
wherein a first end of the tension spring is coupled to a frame;
wherein a second end of the tension spring is coupled to a first end of the lever; and
wherein the lever is configured to pivot about a pivot point such that a second end of the lever moves along the cam surface, such that the tension spring is extended when the inceptor centring device is rotated away from the trim neutral position.

6. The apparatus as claimed in claim 4, wherein the cam surface is a V-shaped cam surface.

7. The apparatus as claimed in claim 1, wherein the trim locking device comprises a power-off brake.

8. The apparatus as claimed in claim 1, wherein the inceptor centring spring is a torsion spring.

9. The apparatus as claimed in claim 1, wherein the inceptor centring spring is a helical torsion spring.

10. The apparatus as claimed in claim 1, wherein the trim mechanism comprises one or more trim sensors configured to detect the trim position.

11. A system comprising:
An apparatus for adjusting aircraft inceptor trim as claimed in claim 1;
a first aircraft inceptor; and
one or more inceptor sensors;
wherein the first inceptor and the one or more inceptor sensors, are mechanically coupled to the control shaft.

12. An apparatus for adjusting aircraft inceptor trim, the apparatus comprising:
an inceptor centring device configured to be mechanically coupled to a control shaft;
wherein the control shaft rotates in response to control inputs provided at the inceptor;
wherein the inceptor centring device comprises an inceptor centring spring;
wherein the inceptor centring spring is preloaded with a preload force; and
wherein the inceptor centring spring is configured to provide a first biasing force to bias the control shaft to an inceptor neutral position; and
a trim mechanism mechanically coupled to the inceptor centring device;
wherein the trim mechanism comprises a trim locking device having:
an unlocked state in which the trim locking device is configured to allow adjustment of the position of the inceptor centring device; and
a locked state in which the trim locking device is configured to maintain the adjusted position of the inceptor centring device;
wherein a resistance force of the trim mechanism with the trim locking device in the unlocked state is less than the preload force, such that when the trim mechanism is in the unlocked state, actuation of the inceptor results in adjustment of the position of the inceptor centring device to alter the inceptor neutral position and hence the degree of aircraft inceptor trim;
wherein the inceptor centring spring is a helical torsion spring;
wherein the inceptor centring device is configured such that the torsion spring is wound more tightly both when the control shaft rotates in the clockwise direction and when the control shaft rotates in the anti-clockwise direction.

13. The apparatus as claimed in claim 12, wherein the inceptor centring device comprises:

a driving member which is coupled to the control shaft; and a retaining member which is configured to be stationary when the trim locking device is in the locked state, and moveable when the trim locking device is in the unlocked state;

wherein the inceptor centring device is configured such that, when the trim locking device is in the locked state and the control shaft is rotated, the driving member acts on a first end of the torsion spring and the retaining member retains a second end of the torsion spring such that the torsion spring is wound more tightly.

14. A system comprising:

an apparatus for adjusting aircraft inceptor trim, the apparatus comprising:

an inceptor centring device configured to be mechanically coupled to a control shaft;

wherein the control shaft rotates in response to control inputs provided at the inceptor;

wherein the inceptor centring device comprises an inceptor centring spring;

wherein the inceptor centring spring is preloaded with a preload force; and wherein the inceptor centring spring is configured to provide a first biasing force to bias the control shaft to an inceptor neutral position; and a trim mechanism mechanically coupled to the inceptor centring device;

wherein the trim mechanism comprises a trim locking device having:

an unlocked state in which the trim locking device is configured to allow adjustment of the position of the inceptor centring device; and a locked state in which the trim locking device is configured to maintain the adjusted position of the inceptor centring device;

wherein a resistance force of the trim mechanism with the trim locking device in the unlocked state is less than the preload force, such that when the trim mechanism is in the unlocked state, actuation of the inceptor results in adjustment of the position of the inceptor centring device to alter the inceptor neutral position and hence the degree of aircraft inceptor trim;

the system further comprising:

a first aircraft inceptor; and one or more inceptor sensors;

wherein the first inceptor and the one or more inceptor sensors, are mechanically coupled to the control shaft;

the system further comprising an inceptor damper mechanically coupled to the inceptor centring device;

wherein the inceptor damper is configured to damp the first biasing force provided by the inceptor centring device.

* * * * *